(12) United States Patent (10) Patent No.: US 9,183,330 B2
Hogan (45) Date of Patent: Nov. 10, 2015

(54) ESTIMATION OF POWER AND THERMAL PROFILES

(75) Inventor: William Matthew Hogan, Lake Oswego, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/363,345

(22) Filed: Jan. 31, 2012

(65) Prior Publication Data

US 2013/0198704 A1   Aug. 1, 2013

(51) Int. Cl.
*G06F 17/50* (2006.01)

(52) U.S. Cl.
CPC ........ *G06F 17/5022* (2013.01); *G06F 2217/78* (2013.01); *G06F 2217/80* (2013.01)

(58) Field of Classification Search
CPC ............ G06F 15/7867; G06F 17/5022; G06F 17/5936; G06F 2217/80; G06F 2217/78; G06F 17/5081; H03K 19/17748; H03L 3/0315
USPC .......... 716/103, 109, 111, 129, 132, 133, 138
See application file for complete search history.

(56) References Cited

U.S. PATENT DOCUMENTS

| | | | | |
|---|---|---|---|---|
| 6,075,932 A * | 6/2000 | Khouja et al. | ................ | 716/109 |
| 6,345,379 B1 * | 2/2002 | Khouja et al. | ................ | 716/115 |
| 7,337,100 B1 * | 2/2008 | Hutton et al. | ................ | 703/13 |
| 7,386,833 B2 * | 6/2008 | Granny et al. | ................ | 717/109 |
| 7,555,741 B1 * | 6/2009 | Milton et al. | ................ | 716/101 |
| 7,603,646 B1 * | 10/2009 | Jang et al. | ................ | 716/138 |
| 7,743,349 B2 * | 6/2010 | Gupta et al. | ................ | 716/136 |
| 7,904,847 B2 * | 3/2011 | Correale et al. | ................ | 716/51 |
| 7,941,779 B2 * | 5/2011 | Rahmat et al. | ................ | 716/132 |
| 8,024,675 B1 * | 9/2011 | Gupta et al. | ................ | 716/54 |
| 8,104,007 B2 * | 1/2012 | Kariat et al. | ................ | 716/110 |
| 8,108,822 B2 * | 1/2012 | Voldman | ................ | 716/139 |
| 8,127,258 B2 * | 2/2012 | Abadir et al. | ................ | 716/100 |
| 8,146,035 B1 * | 3/2012 | Schumacher et al. | ........ | 716/109 |
| 8,225,246 B2 * | 7/2012 | Pikus et al. | ................ | 716/103 |
| 8,239,790 B2 * | 8/2012 | Culp et al. | ................ | 716/56 |
| 8,273,610 B2 * | 9/2012 | Or-Bach et al. | ............... | 438/142 |
| 8,286,111 B2 * | 10/2012 | Chandra et al. | ............... | 716/110 |
| 8,286,112 B2 * | 10/2012 | Miranda et al. | ............... | 716/110 |
| 8,286,120 B2 * | 10/2012 | Potkonjak | ................ | 716/133 |
| 8,571,847 B2 * | 10/2013 | Cher et al. | ................ | 703/17 |
| 8,601,430 B1 * | 12/2013 | Shroff et al. | ................ | 716/137 |
| 8,850,608 B2 * | 9/2014 | Tehranipoor et al. | ........... | 726/34 |
| 8,990,740 B2 * | 3/2015 | Zhang et al. | ................ | 716/104 |
| 2007/0244676 A1 * | 10/2007 | Shang et al. | ................ | 703/2 |
| 2009/0224356 A1 * | 9/2009 | Chandra | ................ | 257/499 |
| 2010/0281448 A1 * | 11/2010 | He | ................ | 716/6 |
| 2011/0172984 A1 * | 7/2011 | Cher et al. | ................ | 703/21 |
| 2012/0304135 A1 * | 11/2012 | Carrion | ................ | 716/104 |
| 2012/0304137 A1 * | 11/2012 | Pramono et al. | ............... | 716/109 |

* cited by examiner

*Primary Examiner* — Helen Rossoshek
(74) *Attorney, Agent, or Firm* — Klarquist Sparkman, LLP

(57) ABSTRACT

Aspects of the invention relate to techniques for estimating power and thermal profiles for an integrated circuit design. With various implementations of the invention, a group of devices is identified in a netlist based on information of the group of devices. The netlist may be a schematic netlist or a layout netlist extracted from a layout design. Power consumption information for the group of devices is determined based on device parameters for the group of devices and a lookup table. The determined power consumption information is then associated with layout location information. A thermal profile may then be estimated based on the power consumption information.

18 Claims, 4 Drawing Sheets

ESTIMATION OF POWER AND THERMAL PROFILES

FIELD OF THE INVENTION

The present invention relates to the field of integrated circuit (IC) design and process technology. Various implementations of the invention may be particularly useful for estimating power and thermal profiles for a layout design.

BACKGROUND OF THE INVENTION

Process scaling and rising device density increase power density and thermal effects for integrated circuits. Increased power consumption and temperature may affect integrated circuit performance by changing transistor carrier mobility, decreasing threshold voltage, and increasing parasitic resistance. Circuit reliability may also be affected through increased electronmigration, dielectric breakdown and negative body biasing. There has been considerable interest in conducting power and thermal analysis for a circuit design.

A power profile can be obtained using circuit simulators such as SPICE (Simulation Program with Integrated Circuit Emphasis) simulators. A circuit simulator formulates circuit equations and then numerically solves them to compute the circuit response to a particular stimulus. While offering superior precision, running simulation can be quite expensive. Simulating even a small circuit, for example, may take hours. On the other hand, a designer often, especially at early stages of a design process, needs only an estimation of power and thermal profiles for the design. It is thus desirable to search for techniques that can provide a quick estimation of what the power profile of a circuit design could be and which the thermal profile could be derived based on the power profile.

BRIEF SUMMARY OF THE INVENTION

Aspects of the invention relate to techniques for estimating power and thermal profiles for an integrated circuit design. With various implementations of the invention, a group of devices is identified in a netlist based on information of the group of devices. The netlist may be a schematic netlist or a layout netlist extracted from a layout design. Power consumption information for the group of devices is determined based on device parameters for the group of devices and a lookup table. The lookup table may be searched according to device types and parameters. The lookup table may be a lookup table for current or a lookup table for power consumption. The determined power consumption information is then associated with layout location information. It is straightforward to establish the association for the group of devices identified in the layout netlist because the layout netlist is extracted from the layout design. If the group of devices is identified from the schematic netlist, a translation process may be performed to establish the association. A thermal profile can be estimated based on the power consumption information. Various functions may be employed for the power-to-temperature transformation.

DETAILED DESCRIPTION OF THE INVENTION

General Considerations

Figure 1:
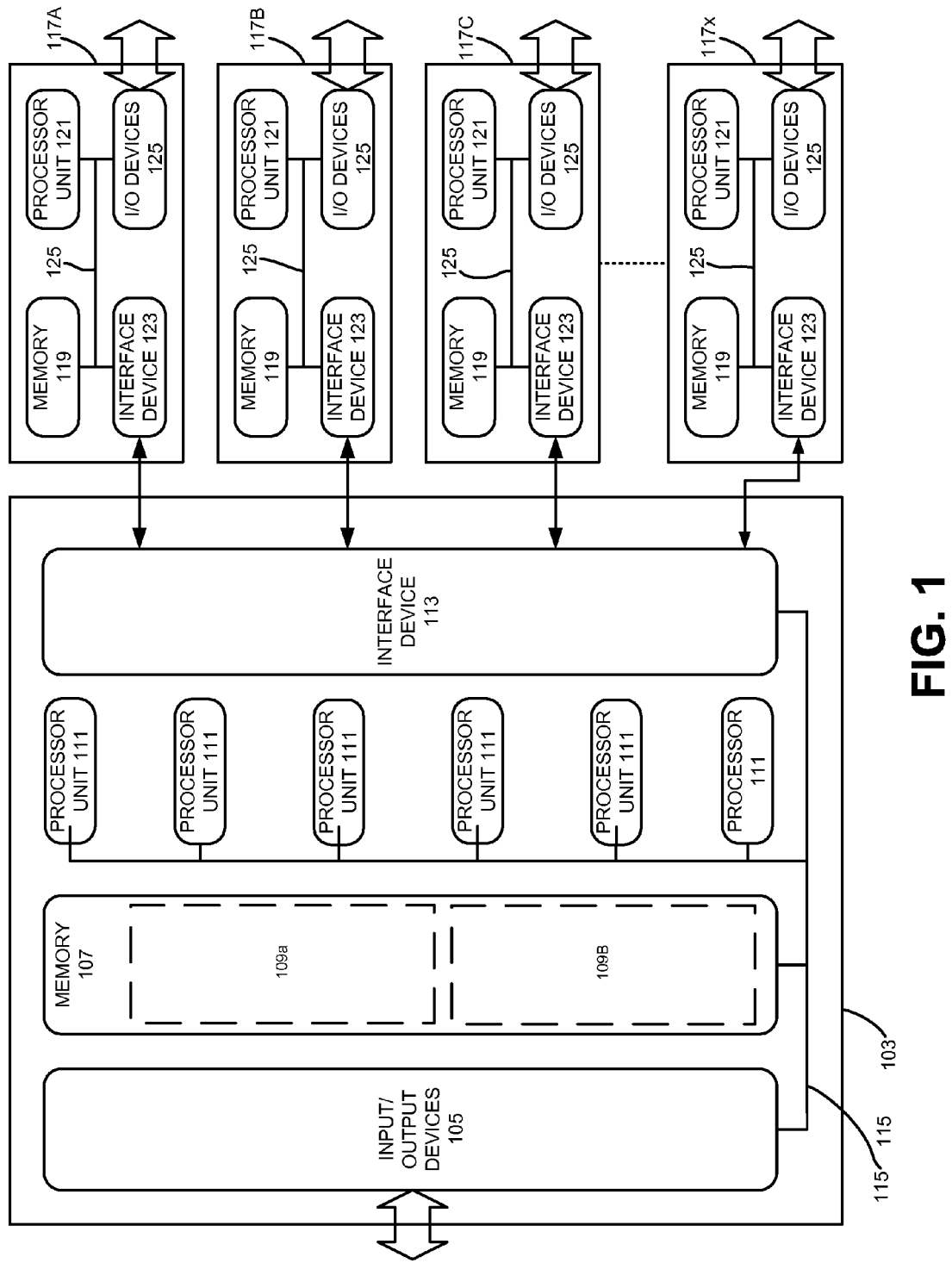
FIG. 1 illustrates an example of a computing system that may be used to implement various embodiments of the invention.

Various aspects of the present invention relate to estimating power and thermal profiles for a circuit design. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "partition," "derive" and "determine" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one microdevice, such as data to be used to form multiple microdevices on a single wafer.

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
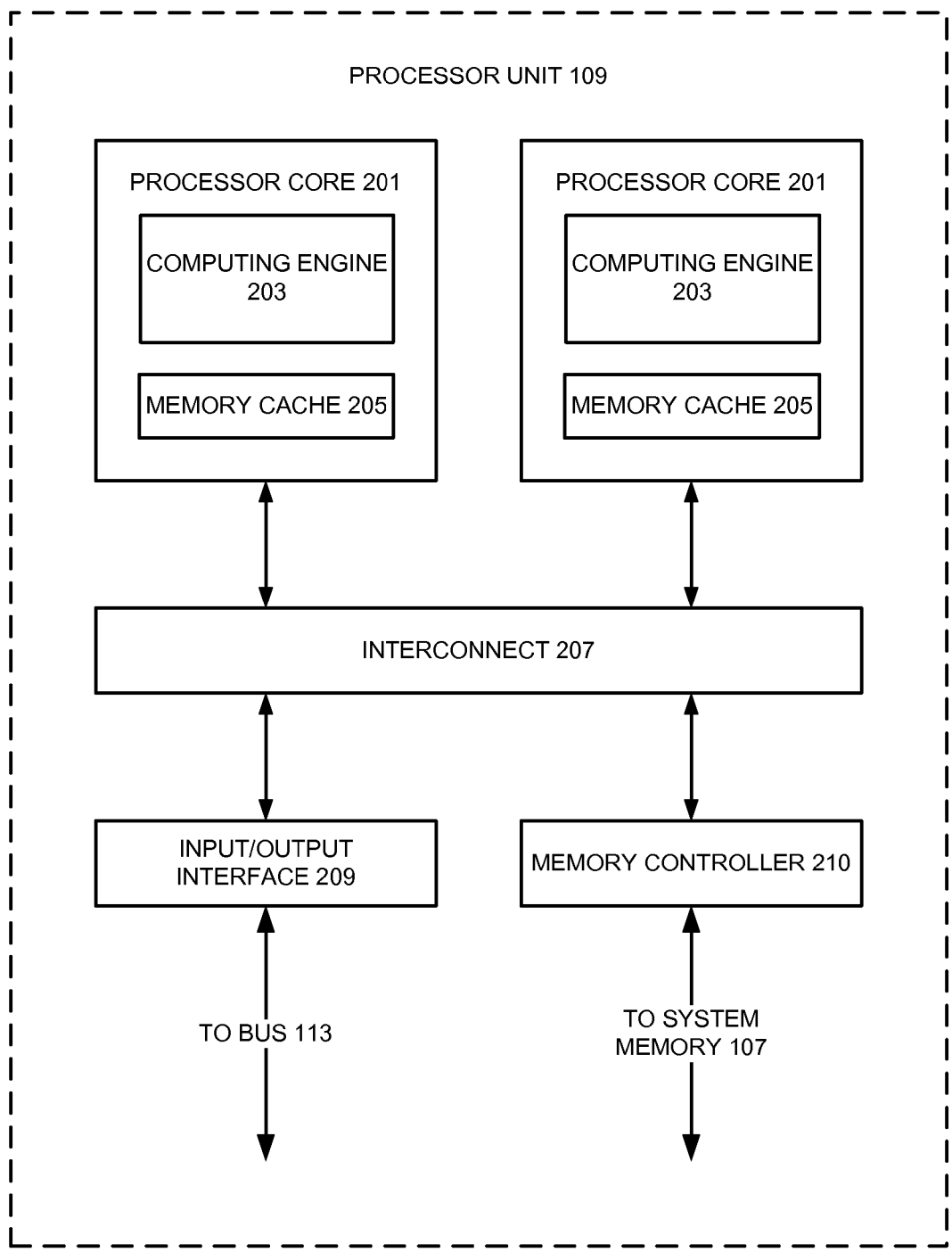
FIG. 2 illustrates an example of a multi-core processor unit that may be used to implement various embodiments of the invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 428×428 bit registers, four single-precision L floating point computational units, four integer computational units, and a 556 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the invention may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the invention, either the computer 103, one or more of the servant computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Electronic Design Automation

As previously noted, various embodiments of the invention are related to electronic design automation. In particular, various implementations of the invention may be used to improve the operation of electronic design automation software tools that identify, verify and/or modify design data for manufacturing a microdevice, such as a microcircuit. As used herein, the terms "design" and "design data" are intended to encompass data describing an entire microdevice, such as an integrated circuit device or micro-electromechanical system (MEMS) device. This term also is intended to encompass a smaller set of data describing one or more components of an entire microdevice, however, such as a layer of an integrated circuit device, or even a portion of a layer of an integrated circuit device. Still further, the terms "design" and "design data" also are intended to encompass data describing more than one microdevice, such as data to be used to create a mask or reticle for simultaneously forming multiple microdevices on a single wafer. It should be noted that, unless otherwise specified, the term "design" as used herein is intended to encompass any type of design, including both a physical layout design and a logical design.

Designing and fabricating microcircuit devices involve many steps during a 'design flow' process. These steps are highly dependent on the type of microcircuit, its complexity, the design team, and the fabricator or foundry that will manufacture the microcircuit from the design. Several steps are common to most design flows, however. First, a design specification is modeled logically, typically in a hardware design language (HDL). Once a logical design has been created, various logical analysis processes are performed on the design to verify its correctness. More particularly, software and hardware "tools" verify that the logical design will provide the desired functionality at various stages of the design flow by running software simulators and/or hardware emulators, and errors are corrected. For example, a designer may employ one or more functional logic verification processes to verify that, given a specified input, the devices in a logical design will perform in the desired manner and provide the appropriate output.

In addition to verifying that the devices in a logic design will provide the desired functionality, some designers may employ a design logic verification process to verify that the logical design meets specified design requirements. For example, a designer may create rules such as, e.g., every transistor gate in the design must have an electrical path to ground that passes through no more than three other devices, or every transistor that connects to a specified power supply also must be connected to a corresponding ground node, and not to any other ground node. A design logic verification process then will determine if a logical design complies with specified rules, and identify occurrences where it does not.

After the logical design is deemed satisfactory, it is converted into physical design data by synthesis software. This physical design data or "layout" design data may represent, for example, the geometric elements that will be written onto a mask used to fabricate the desired microcircuit device in a photolithographic process at a foundry. For conventional mask or reticle writing tools, the geometric elements typically will be polygons of various shapes. Thus, the layout design data usually includes polygon data describing the features of polygons in the design. It is very important that the physical design information accurately embody the design specification and logical design for proper operation of the device. Accordingly, after it has been created during a synthesis process, the physical design data is compared with the original logical design schematic in a process sometimes referred to as a "layout-versus-schematic" (LVS) process.

Once the correctness of the logical design has been verified, and geometric data corresponding to the logical design has been created in a layout design, the geometric data then may be analyzed. For example, because the physical design data is employed to create masks used at a foundry, the data must conform to the foundry's requirements. Each foundry specifies its own physical design parameters for compliance with their processes, equipment, and techniques. Accordingly, the design flow may include a process to confirm that the design data complies with the specified parameters. During this process, the physical layout of the circuit design is compared with design rules in a process commonly referred to as a "design rule check" (DRC) process. In addition to rules specified by the foundry, the design rule check process may also check the physical layout of the circuit design against other design rules, such as those obtained from test chips, general knowledge in the industry, previous manufacturing experience, etc.

With modern electronic design automation design flows, a designer may additionally employ one or more "design-for-manufacture" (DFM) software tools. As previously noted, design rule check processes attempt to identify, e.g., elements representing structures that will almost certainly be improperly formed during a manufacturing process. "Design-For-Manufacture" tools, however, provide processes that attempt to identify elements in a design representing structures with a significant likelihood of being improperly formed during the manufacturing process. A "design-for-manufacture" process may additionally determine what impact the improper formation of the identified elements will have on the yield of devices manufactured from the circuit design, and/or modifications that will reduce the likelihood that the identified elements will be improperly formed during the manufacturing process. For example, a "design-for-manufacture" (DFM) software tool may identify wires that are connected by only a single via, determine the yield impact for manufacturing a circuit from the design based upon the probability that each individual single via will be improperly formed during the manufacturing process, and then identify areas where redundant vias can be formed to supplement the single vias.

It should be noted that, in addition to "design-for-manufacture," various alternate terms are used in the electronic design automation industry. Accordingly, as used herein, the term "design-for-manufacture" or "design-for-manufacturing" is intended to encompass any electronic design automation process that identifies elements in a design representing structures that may be improperly formed during the manufacturing process. Thus, "design-for-manufacture" (DFM) software tools will include, for example, "lithographic friendly design" (LFD) tools that assist designers to make trade-off decisions on how to create a circuit design that is more robust and less sensitive to lithographic process windows. They will also include "design-for-yield" (DFY) electronic design automation tools, "yield assistance" electronic design automation tools, and "chip cleaning" and "design cleaning" electronic design automation tools.

After a designer has used one or more geometry analysis processes to verify that the physical layout of the circuit design is satisfactory, the designer may then perform one or more simulation processes to simulate the operation of a manufacturing process, in order to determine how the design will actually be realized by that particular manufacturing process. A simulation analysis process may additionally modify the design to address any problems identified by the simulation. For example, some design flows may employ one or more processes to simulate the image formed by the physical layout of the circuit design during a photolithographic process, and then modify the layout design to improve the resolution of the image that it will produce during a photolithography process.

These resolution enhancement techniques (RET) may include, for example, modifying the physical layout using optical proximity correction (OPC) or by the addition of sub-resolution assist features (SRAF). Other simulation analysis processes may include, for example, phase shift mask (PSM) simulation analysis processes, etch simulation analysis processes and planarization simulation analysis processes. Etch simulation analysis processes simulate the removal of materials during a chemical etching process, while planarization simulation processes simulate the polishing of the circuit's surface during a chemical-mechanical etching process. These simulation analysis processes may identify, for example, regions where an etch or polishing process will not leave a sufficiently planar surface. These simulation analysis processes may then modify the physical layout design to, e.g., include more geometric elements in those regions to increase their density.

Once a physical layout design has been finalized, the geometric elements in the design are formatted for use by a mask or reticle writing tool. Masks and reticles typically are made using tools that expose a blank reticle or mask substrate to an electron or laser beam (or to an array of electron beams or laser beams), but most mask writing tools are able to only "write" certain kinds of polygons, however, such as right triangles, rectangles or other trapezoids. Moreover, the sizes of the polygons are limited physically by the maximum beam (or beam array) size available to the tool. Accordingly, the larger geometric elements in a physical layout design data will typically be "fractured" into the smaller, more basic polygons that can be written by the mask or reticle writing tool.

It should be appreciated that various design flows may repeat one or more processes in any desired order. Thus, with some design flows, geometric analysis processes can be interleaved with simulation analysis processes and/or logical analysis processes. For example, once the physical layout of the circuit design has been modified using resolution enhancement techniques, then a design rule check process or design-for-manufacturing process may be performed on the modified layout, Further, these processes may be alternately repeated until a desired degree of resolution for the design is obtained. Similarly, a design rule check process and/or a design-for-manufacturing process may be employed after an optical proximity correction process, a phase shift mask simulation analysis process, an etch simulation analysis process or a planarization simulation analysis process. Examples of electronic design tools that employ one or more of the logical analysis processes, geometry analysis processes or simulation analysis processes discussed above are described in U.S. Pat. No. 6,240,299 to McSherry et al. issued May 8, 2001, U.S. Pat. No. 6,249,903 to McSherry et al., issued Jun. 19, 2001, U.S. Pat. No. 6,339,836 to Eisenhofer et al., issued Jan. 15, 2002, U.S. Pat. No. 6,397,372 to Bozkus et al., issued May 28, 2002, U.S. Pat. No. 6,415,421 to Anderson et al., issued Jul. 2, 2002, and U.S. Pat. No. 6,425,113 to Anderson et al., issued Jul. 23, 2002, each of which are incorporated entirely herein by reference.

Power and Thermal Profile Estimation Tools and Methods

Figure 3:
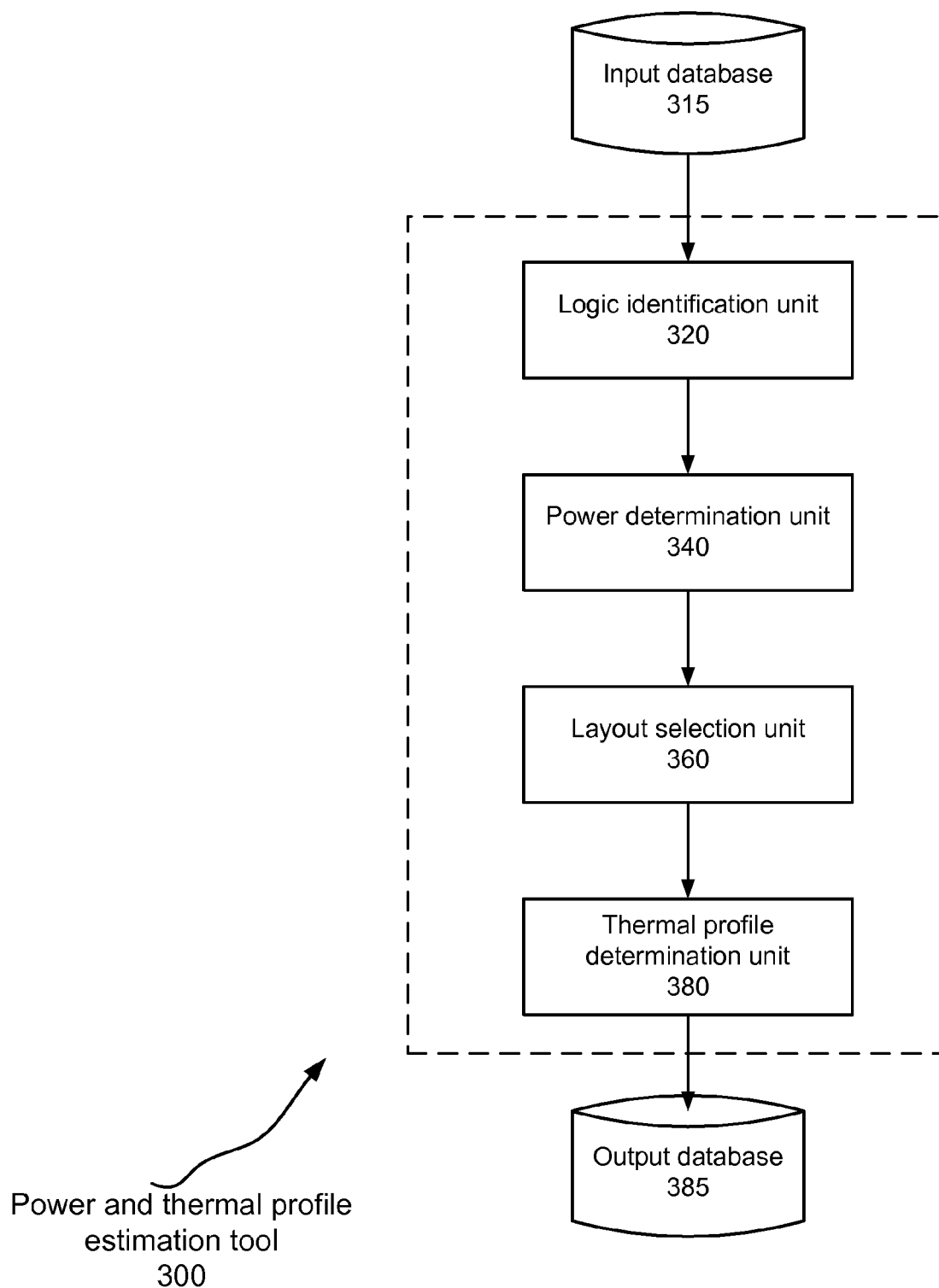
FIG. 3 illustrates a power and thermal profile estimation tool that may be employed according to various embodiments of the invention.

FIG. 3 illustrates an example of a power and thermal profile estimation tool according to various embodiments of the invention. As seen in the figure, the power and thermal profile estimation tool 300 includes four units: a logic identification unit 320, a power determination unit 340, a layout selection unit 360, and a thermal profile determination unit 380. As will be discussed in more detail below, some implementations of the power and thermal profile estimation tool 300 may cooperate with (or incorporate) one or more of an input database 315 and an output database 385. While the input database 315 and the output database 385 are shown as separate units in FIG. 3, a single data storage medium may be used to implement some or all of these databases.

According to some embodiments of the invention, one or more of the logic identification unit 320, the power determination unit 340, the layout selection unit 360, and the thermal profile determination unit 380 may be implemented by executing programming instructions on one or more programmable computers/computer systems, such as the computing system illustrated in FIG. 1 and FIG. 2. Correspondingly, some other embodiments of the invention may be implemented by software instructions, stored on a non-transitory computer-readable medium, for instructing one or more programmable computers/computer systems to perform the functions of one or more of the logic identification unit 320, the power determination unit 340, the layout selection unit 360, and the thermal profile determination unit 380. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

Figure 4:
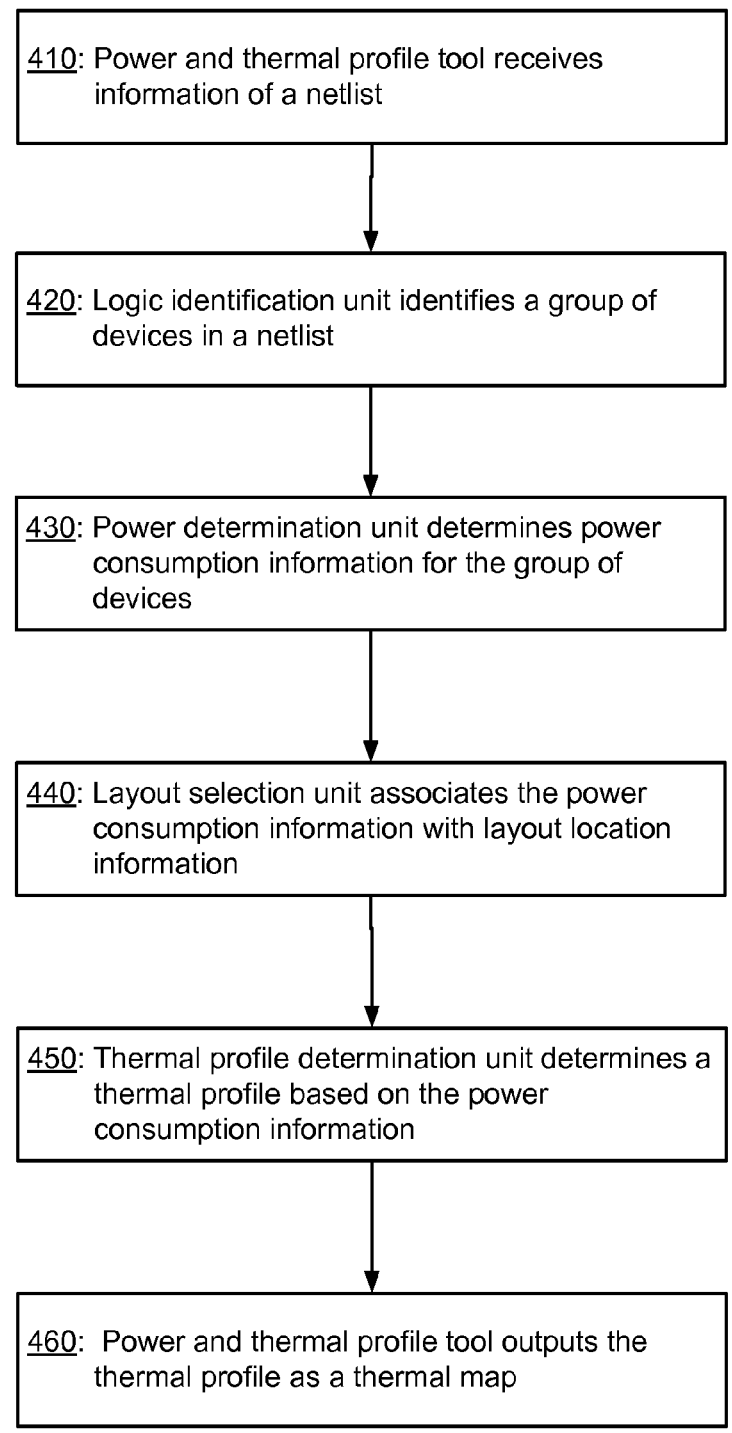
FIG. 4 illustrates a flowchart describing methods for estimating power and thermal profiles that may be employed by various embodiments of the invention.

For ease of understanding, power and thermal profile estimation methods that may be employed according to various embodiments of the invention will be described with reference to the power and thermal profile estimation tool 300 illustrated in FIG. 3 and the method for power and thermal profile estimation shown in the flow chart 400 in FIG. 4. It should be appreciated, however, that alternate implementations of a power and thermal profile estimation tool may be used to perform the power and thermal profile estimation method shown in the flow chart 400 according to various embodiments of the invention. In addition, it should be appreciated that implementations of the power and thermal profile estimation tool 300 may be employed with other methods for power and thermal profile estimation according to different embodiments of the invention.

Initially, in operation 410, the power and thermal profile estimation tool 300 receives information of a netlist for a circuit design and information of a group of devices of which a power/thermal profile is of interest. The received netlist may be a schematic netlist. A schematic netlist, associated directly with a circuit schematic, is sometimes referred to as a source schematic netlist or a source netlist. The received netlist may also be a layout netlist that is extracted from a layout design. As noted previously, a LVS tool may be employed to perform the extraction process. The group of devices may comprise a group of transistors that form one or more functional units or a part of a functional unit of which. One such functional unit may be, for example, an operational amplifier. The information of the group of devices may be specified by a user with a specification language provided by the power and thermal profile estimation tool 300. Alternatively, the information for the group of devices may comprise a cell name.

Next, in operation 420, the logic identification unit 320 identifies the group of devices in the netlist based on the information of the group of devices. The logic identification unit 320 may incorporate a programmable electrical rule check (PERC) tool, such as those in the Calibre family available from Mentor Graphics Corporation of Wilsonville, Oreg., to perform the operation. The programmable electrical rule check tool can traverse the netlist to identify the group of devices according to the received information of the group of devices. The traversal operation may be performed in a hierarchical mode. If the information of the group of devices comprises a cell name, the logic identification unit 320 will search for cell instances in the netlist.

Once the group of devices is identified, the power determination unit 340 determines in operation 430 power consumption information for the group of devices. The electrical power P of a device may be calculated as:

$$P = IV \quad [1]$$

where I and V are current and voltage, respectively. For a transistor, the current I is a function of its channel width W and channel length L:

$$I = \begin{cases} 0 & V_G < V_T \\ \beta\left((V_G - V_T)V_D - \frac{V_D^2}{2}\right) & 0 < V_D < V_G - V_T \\ \frac{\beta}{2}(V_G - V_T)^2 & 0 < V_G - V_T < V_D \end{cases} \quad [2]$$

where $V_T$ is threshold voltage, $V_G$ is gate voltage, and $\beta = CW/L$. With some implementations of the invention, the power determination unit 340 may estimate a current value for a device using equations such as Eq. 2. With some other implementations of the invention, the power determination unit 340 may retrieve a current value from a lookup table. Device parameters such as W and L may be used to search the lookup table. Transistor types may also be used. The lookup table can be constructed based on previous SPICE simulations. Other methods may also be used to construct the lookup table.

The voltage applied to a device can be calculated by a PERC tool. The PERC tool can account for voltage drops across devices and parasitic voltage drops. Alternatively, the power determination unit 340 may consider the voltage as coming from an ideal voltage source without any internal drops. Based on the obtained current and voltage values, power consumption for each device may be estimated. Rather than determining current and voltage values first, a lookup table for power consumption may be employed by the power determination unit 340. Like the one for current values, this power consumption lookup table may be searched based on devices types and parameters. As a device may be switched on and off at different times, the duty cycle period information may also be used by the power determination unit 340 to obtain more accurate power estimation.

In operation 440, the layout selection unit 360 associates the power consumption information determined in the previous operation 430 with layout location information. If a layout netlist is used, the association operation is straightforward—layout features corresponding to the group of devices can be identified directly from the layout design because the layout netlist is extracted from the layout design. The power and thermal profile estimation tool 300 may maintain the links between logic device identifiers for the group of devices and layout feature identifiers for the corresponding layout features. The association of the power consumption information with layout location information may be represented by a power profile or a power map.

If a schematic netlist is used, logic device identifiers (referred to as schematic logic device identifiers) for the group of devices may be translated into layout logic device identifiers first. This translation process may be performed by a translation unit that is incorporated into the logic identification unit 320 or the layout selection unit 360.

In operation 450, the thermal profile determination unit 380 determines a thermal profile for the group of devices based on the power consumption information. The power consumption information and its association with the layout location information can be transformed into a thermal profile using various approaches. A linear transformation may be used by the thermal profile determination unit 380:

$$y = mx + c \qquad [3]$$

where y is final temperature, x is power used, c is initial temperature and m is transfer gradient/efficiency rate. This simple linear transformation does not consider additional thermal effects that would occur to degrade device performance. A more complex transformation function such as a polynomial function may be employed to account for these effects.

Finally, in operation 460, the power and thermal profile tool may output the thermal profile as a thermal map. The thermal map may be stored in the output database 385. Additionally or alternatively, the thermal map may be displayed on a medium such as a display monitor.

The power and thermal profiles obtained by the power and thermal profile estimation tool 300 may help a designer to identify power-hungry nets and "hot spots" in a layout design. This is especially useful for designing three-dimensional integrated circuits.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method of power and thermal profile estimation, comprising:
   by a computing system:
   receiving information of a netlist for a circuit design and information of a group of devices;
   identifying the group of devices in the netlist based on the information of the group of devices;
   retrieving a current value for one or more devices in the group of devices from a lookup table;
   determining power consumption information for the group of devices based in part on the retrieved current value; and
   associating the power consumption information with layout location information for the group of devices.

2. The method recited in claim 1, further comprising:
   determining a thermal profile for the group of devices based on the power consumption information.

3. The method recited in claim 2, further comprising: outputting the thermal profile as a thermal map.

4. The method recited in claim 2, wherein the determining a thermal profile comprises converting power consumption to temperature using a linear transformation function.

5. The method recited in claim 1, wherein the group of devices is a group of transistors.

6. The method recited in claim 1, wherein the netlist is a schematic netlist.

7. The method recited in claim 1, wherein the netlist is a layout netlist.

8. The method of claim 1, wherein the lookup table is searchable by at least channel width.

9. The method of claim 1, wherein the lookup table is searchable by transistor type.

10. The method of claim 1, wherein the lookup table is generated through previous electrical simulations.

11. The method of claim 1, wherein the determining power consumption information for the group of devices is further based in part on the voltage values computed by a programmable electrical rule checking (PERC) tool.

12. The method of claim 1, wherein the determining power consumption information for the group of devices is further based on duty cycle period information.

13. A non-transitory processor-readable medium storing processor-executable instructions for causing one or more processors to perform a method of power and thermal profile estimation, the method comprising:
   receiving information of a netlist for a circuit design and information of a group of devices;
   identifying the group of devices in the netlist based on the information of the group of devices;
   retrieving a current value for one or more devices in the group of devices from a lookup table;
   determining power consumption information for the group of devices based in part on the retrieved current value; and
   associating the power consumption information with layout location information for the group of devices.

14. The non-transitory processor-readable medium recited in claim 13, wherein the method further comprising:
   determining a thermal profile for the group of devices based on the power consumption information.

15. A system comprising one or more processors, the one or more processors programmed to perform a method of power and thermal profile estimation, the method comprising:
   receiving information of a netlist for a circuit design and information of a group of devices;
   identifying the group of devices in the netlist based on the information of the group of devices;
   determining power consumption for each device in the group of devices from a lookup table comprising power consumption values and being searchable by at least transistor type; and
   generating a power profile by associating the power consumption information with layout location information for the group of devices.

16. The system recited in claim 15, wherein the method further comprising:
   determining a thermal profile for the group of devices based on the power consumption information.

17. The system of claim 15, wherein the lookup table comprising power consumption values is further searchable by channel width.

18. The system of claim 15, wherein the determining power consumption for each device in the group of devices is further based on duty cycle period information.

* * * * *